United States Patent [19]
Tattermusch

[11] Patent Number: 5,988,660
[45] Date of Patent: Nov. 23, 1999

[54] VEHICLE REAR AXLE HAVING AT LEAST TWO TRANSVERSE LEAF SPRINGS ARRANGED ONE BEHIND ANOTHER

[75] Inventor: Peter Tattermusch, Esslingen, Germany

[73] Assignee: DaimlerChrysler AG, Stuttgart, Germany

[21] Appl. No.: 09/233,622

[22] Filed: Jan. 19, 1999

[30] Foreign Application Priority Data

Jan. 17, 1998 [DE] Germany .......................... 198 01 668

[51] Int. Cl.[6] .............................. B60G 7/00; B60G 11/08
[52] U.S. Cl. ..................................... 280/124.171; 267/246
[58] Field of Search ........................... 280/686, 124.106, 280/124.17, 124.171, 124.175, 124.11, FOR 120, FOR 151, FOR 156, FOR 175, FOR 176; 267/246, 52, 36.1

[56] References Cited

U.S. PATENT DOCUMENTS 4,458,918  7/1984  Rumpel ............................. 280/124.171

FOREIGN PATENT DOCUMENTS 33 02 627 A1  9/1983  Germany .
55-51602      4/1980  Japan ............................. 280/FOR 176

*Primary Examiner*—Christopher P. Ellis
*Assistant Examiner*—Faye M. Fleming
*Attorney, Agent, or Firm*—Kenyon & Kenyon

[57] ABSTRACT

The present invention relates to an independent suspension system for a vehicle rear axle, the transverse leaf springs articulatedly supporting, at the free ends, one hub carrier per vehicle side; and each transverse leaf spring being braced between its ends on the vehicle body by way of at least one articulation point. In the rear axle, the transverse leaf springs are at least transversely displaceably mounted in the body-side articulation points. In addition, they are articulatedly joined to one another in the region between the hub carriers via at least one coupling element, the pivot points having pivot axes which are aligned at least approximately parallel to the vehicle's vertical axis. At least one coupling element is mounted pivotably on the vehicle body about at least one approximately vertical axis. A vehicle axis thus is created whose transverse leaf springs are precisely guided despite being mounted in vibration-damping fashion on the vehicle body, and are very little influenced in terms of their elastic line.

6 Claims, 2 Drawing Sheets

VEHICLE REAR AXLE HAVING AT LEAST TWO TRANSVERSE LEAF SPRINGS ARRANGED ONE BEHIND ANOTHER

FIELD OF THE INVENTION

The present invention relates generally to vehicle suspension systems and more particularly to an independent suspension system for a vehicle rear axle.

RELATED TECHNOLOGY

German Patent Application No. 33 02 627 discloses an independent suspension system for a vehicle rear axle having two transverse leaf springs arranged one behind another, the transverse leaf springs articulatedly supporting, at the free ends, one hub carrier per vehicle side. Each transverse leaf spring is braced between its ends on the vehicle body by way of at least one articulation point. The transverse leaf springs form the lower links of a damper strut axle and a double transverse link axle. In one portion of an exemplary embodiment, the transverse leaf springs are clamped rigidly, thereby disadvantageously influencing the spring characteristic. Another portion of the exemplary embodiment shows rigid clamping only of the rear transverse leaf spring. The front transverse leaf spring is mounted in oscillating and/or displaceable fashion, so that its spring rate is lower than that of the rear. In the presence of positive and/or negative vehicle acceleration, the rear axle thus tends to oscillate about the rear transverse leaf spring in a manner detrimental to ride comfort. In addition, the hub carriers are mounted articulatedly at the ends of the transverse leaf springs and the front pivot points have a large transverse clearance, so that the wheels can steer slightly—individually or coupled via the front transverse leaf spring—in response to a lateral force. Since the steering motion causes the wheels to be pivoted about the pivot points of the rear leaf spring, a definite track offset occurs there.

SUMMARY OF THE INVENTION

An object of the present invention is to create a vehicle rear axle with transverse leaf springs whose transverse leaf springs can be precisely guided with minimal weight, simple configuration, and uncomplicated assembly despite being mounted in vibration-damping fashion on the vehicle body, and are influenced very little in terms of their elastic line. The guidance system of the transverse leaf springs may have self-steering characteristics which depend on lateral force.

The present invention provides an independent suspension system for a vehicle rear axle comprising at least two transverse leaf springs arranged one behind another, the transverse leaf springs articulatedly supporting, at the free ends, one hub carrier per vehicle side; and each transverse leaf spring being braced between its ends on the vehicle body by way of at least one articulation point, wherein the transverse leaf springs (21, 22) are at least transversely displaceably mounted in the body-side articulation points (24);

the transverse leaf springs (21, 22) are articulatedly joined to one another in the region between the hub carriers (4) via at least one coupling element (31, 32), the pivot points (26–29) having pivot axes (14) which are aligned at least approximately parallel to the vehicle's vertical axis (12); and at least one coupling element (31, 32) is mounted pivotably on the vehicle body (8, 9) about at least one approximately vertical axis (15).

In the rear axle, the transverse leaf springs are at least transversely displaceably mounted in the body-side articulation points. In addition, in the region between the hub carriers they are joined articulatedly to one another via at least one coupling element, the pivot points having pivot axes which are aligned at least approximately parallel to the vehicle's vertical axis. In this context, at least one coupling element is mounted pivotably on the vehicle body about at least one approximately vertical axis.

The wheel-guided transverse leaf springs absorb forces in all directions, and thereby replace at least two lower links and two helical springs. The lower link assembly can be expanded, with a wheel-guiding damper or with upper links, into a complete wheel locating system.

The transversely oriented leaf springs are guided on the vehicle body in articulation points, where they are braced predominantly in the longitudinal direction of the vehicle and toward the top. Bracing is accomplished in elastic fashion such that the individual transverse leaf spring has, during spring deflection, an elastic line which corresponds approximately to the elastic line of a freely vibrating comparison spring. Clamping to the vehicle body results in only an insignificant increase in the spring rate of the transverse leaf springs during both simultaneous and alternating spring deflection.

The linkage rod arranged between the transverse leaf springs transfers the lateral forces acting on the wheels via a pivot point to the vehicle body. In the pivot point, the linkage rod can unrestrictedly follow the linear stroke motion of the transverse leaf springs.

The linkage rod can be attached between the hub carriers, for example, in a vibration node or deformation node of the leaf springs that are made, for example, of a composite material; the result is on the one hand that the leaf spring characteristic remains uninfluenced, and on the other hand that only low-amplitude vibrations are passed on to the articulation points.

In addition to the asymmetrical, one-sided arrangement, it is also possible to use two or more linkage rods in order to synchronize the transverse leaf springs in their displacement in response to longitudinal and transverse forces.

By way of the location of the articulation point of the linkage rods on the vehicle body with reference to the spacing from the wheel center transverse plane, specific self-steering characteristics can be defined for the rear axle. The bandwidth extends from an understeering to an oversteering influence.

BRIEF DESCRIPTION OF THE DRAWINGS

Further details of the present invention are evident from the description below of several schematically depicted embodiments, in which.

DETAILED DESCRIPTION

Figure 1:
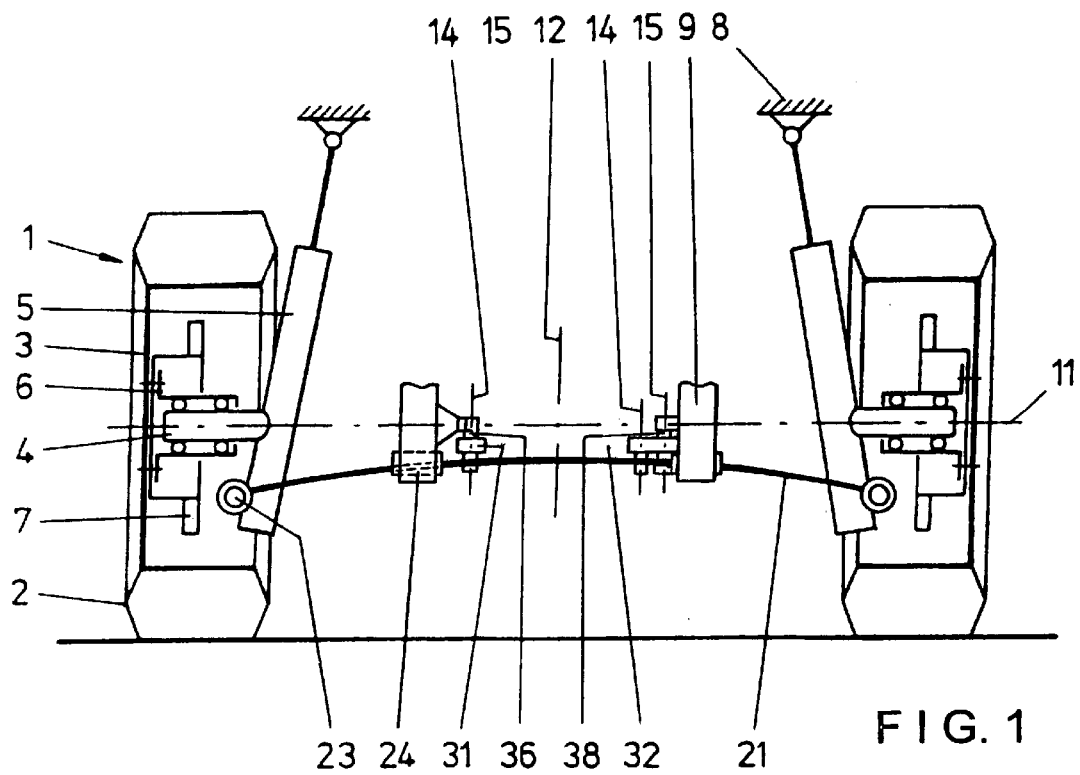
FIG. 1 shows a front view of an independent suspension system according to the present invention, with various coupling elements.
Figure 2:
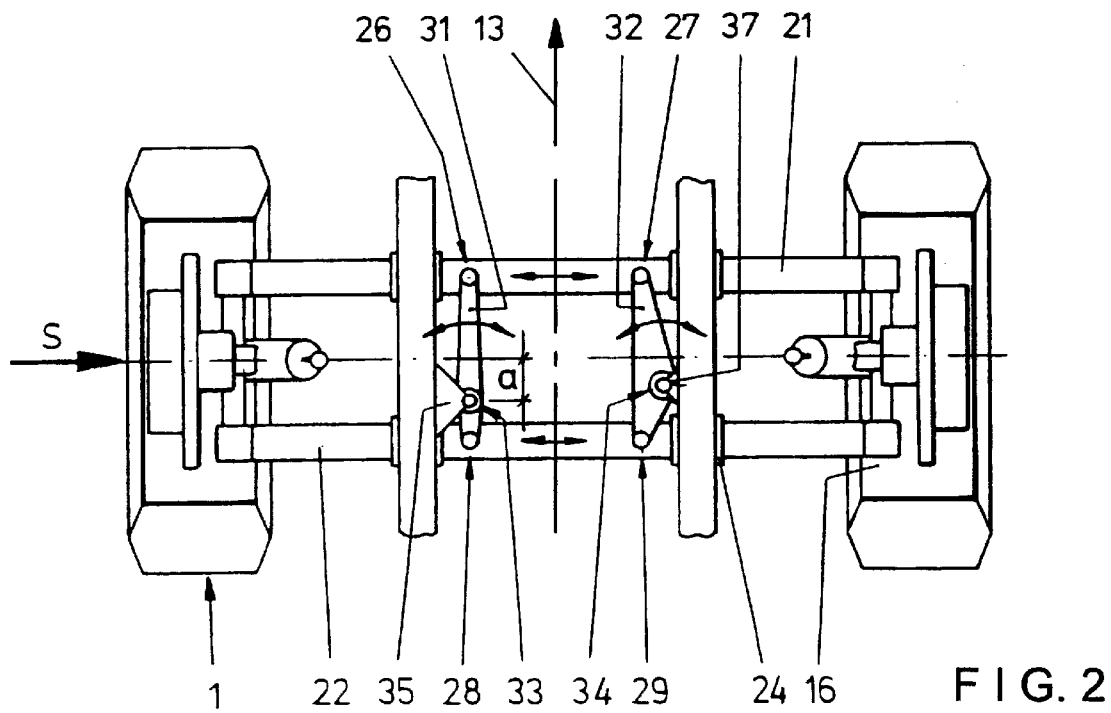
FIG. 2 shows a plan view of the independent suspension system of FIG. 1.
Figure 3:
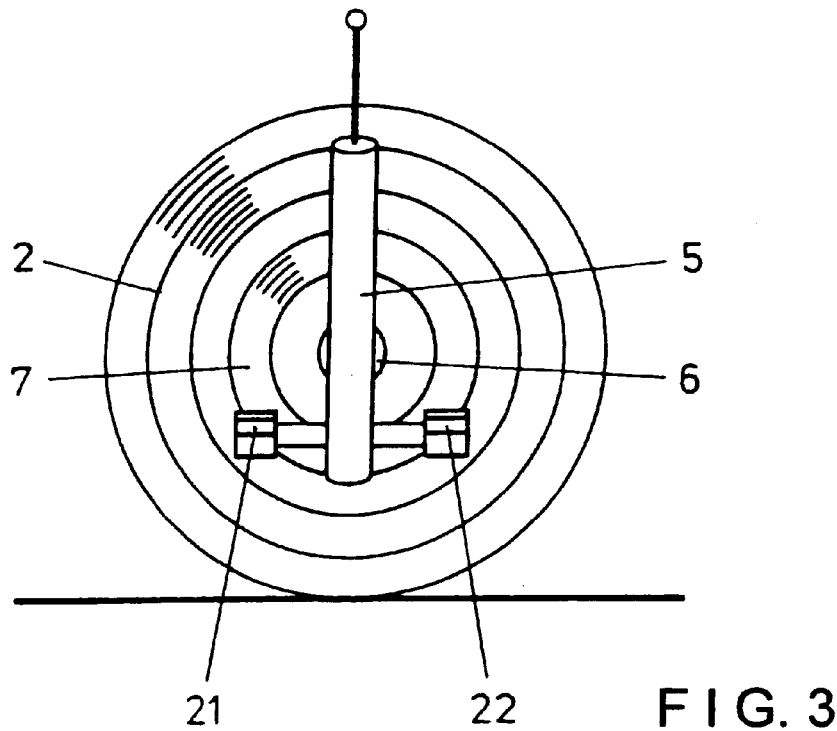
FIG. 3 shows a side view of the independent suspension system of FIG. 1.

FIGS. 1, 2 and 3 show an independent suspension system for a passenger car rear axle. The rear axle has, between wheels 1, two transverse leaf springs 21, 22 lying parallel to and behind one another. Each transverse leaf spring 21, 22 is mounted on vehicle body 8 on frame rails 9 in two spring mounts 24. Spring mounts 24 are, for example, elastic rubber mounts which have high stiffness in the longitudinal and vertical directions of the vehicle, while in the transverse direction of the vehicle, with a low stiffness, they allow a linear stroke of several millimeters under a lateral force. The individual spring mount 24 has approximately the function of a prismatic linkage with elastic return.

Transverse leaf springs 21, 22 installed below the horizontal wheel center plane each enclose in pairs, in the rim region of wheels 1, a wheel pivot pin 23. Wheel pivot pins 23 and the leaf spring ends which surround them, for example in the form of a closed spring eye, form swivel joint mounts with approximately horizontal axes. These swivel joint mounts are also designed elastically in the longitudinal direction of the vehicle in order to improve the longitudinal suspension comfort of the rear axle. At the least, the swivel joint mounts are of sufficiently elastic configuration that wheel pivot pins 23 are pivotable in the spring eyes on the one hand in the transverse direction of the vehicle about an approximately vertical axis, and on the other hand slightly, for example by +/−10 degrees, about a horizontal axis parallel to the axle.

One damper strut 5, which is braced via its piston rod on vehicle body 8, is arranged rigidly on each wheel side on wheel pivot pin 23. A hub carrier 4 is shaped or attached on damper strut 5 above wheel pivot pin 23. A wheel hub 6, a brake disk 7, and a tire-shod rim 3 sit in roller bearings on hub carrier 4.

In the independent suspension systems depicted, transverse leaf springs 21, 22 form the lower links of a damper strut axle. Alternatively, the damper strut can be replaced by almost any common link arrangement.

Transverse leaf springs 21, 22 are mechanically joined to one another, for example in the region between frame rails 9 and their spring mounts 24, via coupling elements 31, 32. In the exemplary embodiments, these coupling elements 31, 32 are linkage rods which on the one hand are attached articulatedly at their free ends to transverse leaf springs 21, 22, and on the other hand are braced articulatedly on vehicle body 8, 9.

In FIGS. 1 and 2, the three pivot points per linkage rod 31, 32 all have an approximately vertical pivot axis 14, the individual swivel joints 26, 27, 28, 29, 33 and 34 being configured, for example, as ball joints. All the swivel joints 26–29, 33 and 34 are designed to be dimensionally rigid at least in the horizontal transverse and longitudinal directions of the vehicle. At least swivel joints 33, 34 shown in FIGS. 1 and 2 allow the vertical offset which occurs as transverse leaf springs 21, 22 deform during spring deflection.

In pivot points 26–29, linkage rods 31, 32 can be fork-shaped and can fit around transverse leaf springs 21, 22 at the top and bottom.

FIGS. 1 and 2 depict, only by way of example, two different linkage rods 31, 32 and corresponding mounting points on one rear axle. As a general rule, identical linkage rods 31, 32 with mirror-symmetrical mounting points are used for each rear axle. Asymmetrical bracing with only one coupling element, e.g. linkage rod 31, is also possible.

In the case of the left-hand linkage rod 31, pivot points 26, 28, 33 are located one behind another on the working line of linkage rod 31. Bracing of this linkage rod 31 on the left-hand frame rail 9 is accomplished via a bearing bracket 35. Attached on the latter is a bearing pin 36 which carries swivel joint 33.

Pivot point 33 is arranged offset by a distance a from axle centerline 11. If, as depicted in FIG. 2, a lateral force S is then applied, when the vehicle is traveling in a curve, to the left-hand wheel 1 that is on the outside of the curve, that force is passed on primarily via transverse leaf springs 21, 22 and linkage rod 31, offset via "lever" or distance a, into vehicle body 8, 9 at pivot point 33. Because of the offset a, the front transverse leaf spring 21 shifts to the right, while the rear transverse leaf spring 22 migrates out to the left, decreased by the lever ratio of linkage rod 31. Linkage rod 31 is thereby forced to pivot slightly clockwise about the axis of pivot point 33. Wheels 1, steering to the right, pivot approximately synchronously with linkage rod 31. In this case the rear axle has an understeering effect.

Pivot point 33 can also lie outside the region between transverse leaf springs 21, 22, for example behind transverse leaf spring 22. In addition, the pivoting motion of linkage rod 31, 32 can be hydraulically damped. For this purpose, the individual linkage rods can additionally be braced, for example using a damper, on vehicle body 8 and/or on frame rails 9.

The transverse motion of transverse leaf springs 21, 22 optionally are delimited by stops.

Since, as the vehicle travels through a real curve, the wheel contact surface of the wheel on the outside of the curve deforms into a kidney shape in response to the lateral force, and its application point thus moves away from the wheel center toward the rear with increasing lateral force, it is possible by way of the offset a to impose a driving characteristic that, for example, acts in understeering fashion with low lateral force and in neutral or oversteering fashion with high lateral force.

Since pivot point 33 moreover is located, as a rule, only a few millimeters or centimeters in front of or behind the axle centerline or the vertical wheel center transverse plane, the center point of the wheel contact surface shifts only slightly in the transverse direction.

The right-hand linkage rod 32 depicted in FIGS. 1 and 2 is articulated via a bearing pin 38 in a double bearing bracket 37 arranged on frame rail 9. Pivot axis 15 is arranged at a lateral offset with respect to a line joining swivel joints 27 and 29. When linkage rod 32 pivots in response to a lateral force, spring mounts 24 become harder in the longitudinal direction of the vehicle. With an appropriate design of spring mount 24, the spring rate of transverse leaf springs 21, 22 in curves can thereby be additionally increased.

Figure 4:
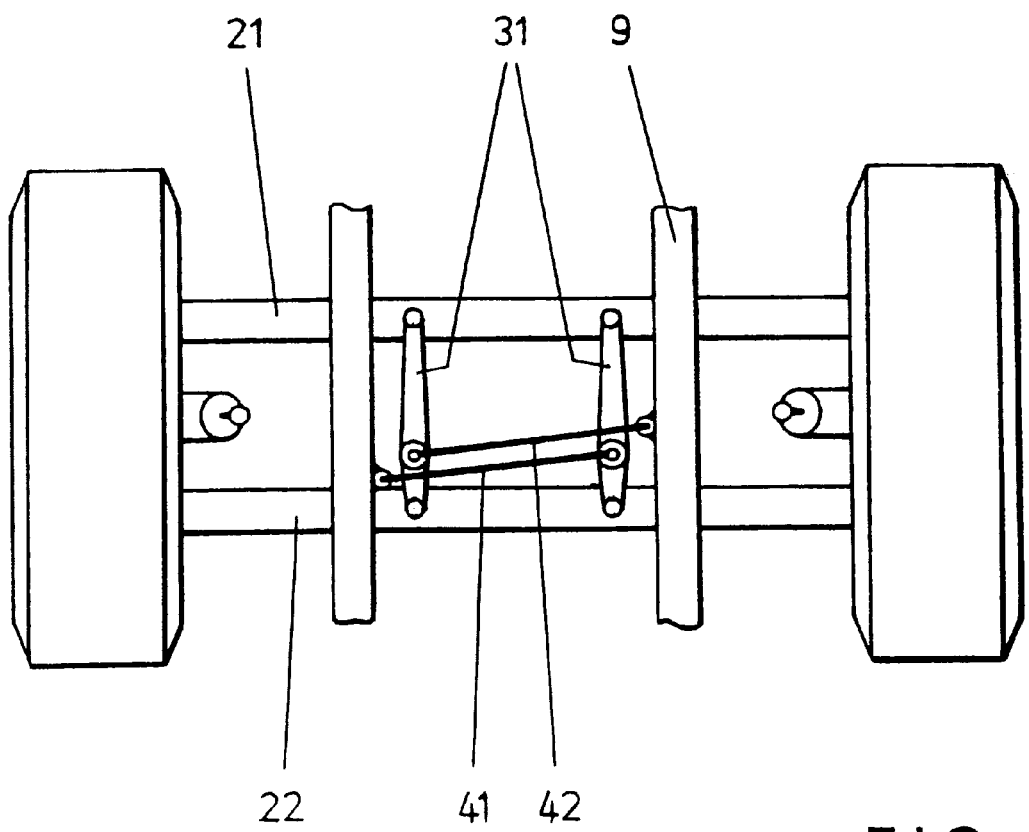
FIG. 4 shows a plan view of an independent suspension system according to the present invention with coupling elements braced via linkage rods.

FIG. 4 shows a rear axle having two linkage rods 31 braced via articulating rods 41, 42 on vehicle body 8, 9. Articulating rods 41, 42 can be joined to the linkage rods via joints which require no linear degree of freedom in the vertical direction. They can also be attached without defined articulation points to linkage rod 31 and/or to vehicle body 8, 9, so that they act as return springs for the laterally deflected transverse leaf springs 21, 22.

LIST OF PARTS

1 Wheel
2 Tire
3 Rim
4 Hub carrier
5 Damper strut
6 Wheel hub
7 Brake disk
8 Vehicle body
9 Frame rail
11 Axle centerline 12 Vehicle's vertical axis
13 Direction of travel
14 Pivot axes of swivel joints 26–29
15 Pivot axes of swivel joints 33, 34
16 Pivot axes of wheel pivot pin 23
21 Transverse leaf spring, front
22 Transverse leaf spring, rear
23 Wheel pivot pin
24 Articulation points, spring mounts on 9
26, 27 Swivel joints on 21
28, 29 Swivel joints on 22
31, 32 Coupling element, linkage rod
33, 34 Swivel joints on 9
35 Bearing bracket for 31
36 Bearing pin
37 Double bearing bracket for 32
38 Bearing pin
41, 42 Articulating rods

I claim:

1. An independent suspension system for a rear axle of a vehicle, the vehicle having a vehicle body, a first hub carrier on one side of the vehicle and a second hub carrier on another side of the vehicle, the vehicle body having a vertical axis, the independent suspension system comprising:

a first transverse leaf spring having a first free end and a second free end;

a second transverse leaf spring having a third free end and a fourth free end, the second transverse leaf spring being arranged behind the first transverse leaf spring, the first and second transverse leaf springs articulatedly supporting the first hub carrier at the first and third free ends, the first and second transverse leaf springs articulatedly supporting the second hub carrier at the second and fourth free ends, the first transverse leaf spring being at least transversely displaceably mounted with respect to the vehicle body between the first and second free ends at a first articulation point and the second transverse leaf spring being at least transversely displaceably mounted with respect to the vehicle body between the third and fourth free ends at a second articulation point; and a coupling element having first pivot points, the coupling element articulatedly joining the first and second transverse leaf springs through the first pivot points in a region between the first and second hub carriers, the first pivot points having pivot axes aligned approximately parallel to the vertical axis, the coupling element being mounted pivotably with respect to the vehicle body at a second pivot point, the second pivot point having a second axis aligned approximately parallel to the vertical axis.

2. The independent suspension system as recited in claim 1 wherein the second pivot point is arranged at an offset with respect to a vertical wheel center transverse plane of the vehicle.

3. The independent suspension system as recited in claim 1 further comprising a second coupling element articulatedly joining the first and second transverse leaf springs, the coupling element and the second coupling element being linkage rods of identical or mirror-symmetrical configuration.

4. The independent suspension system as recited in claim 1 further comprising an articulating rod connecting the vehicle body to the second pivot point.

5. The independent suspension system as recited in claim 4 further comprising a second coupling element for coupling the first and second transverse leaf springs, the articulating rod crossing the second coupling element.

6. The independent suspension system as recited in claim 1 wherein the coupling element is articulated on the vehicle body or on a frame rail of the vehicle body through a hydraulic or pneumatic damping element.

* * * * *